United States Patent
Iijima et al.

(10) Patent No.: US 6,643,235 B2
(45) Date of Patent: Nov. 4, 2003

(54) OPTICAL DISC RECORDING AND REPRODUCING APPARATUS HAVING AUTOMATIC GATE SIGNAL GENERATION MODES

(75) Inventors: Yukio Iijima, Ikoma (JP); Nobuaki Minakuchi, Ibaraki (JP); Hidemi Takahashi, Osaka (JP); Yasushi Ueda, Saijo (JP); Makoto Okazaki, Niihama (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/218,409

(22) Filed: Aug. 15, 2002

(65) Prior Publication Data

US 2002/0191509 A1 Dec. 19, 2002

Related U.S. Application Data

(62) Division of application No. 09/206,953, filed on Dec. 8, 1998, now Pat. No. 6,459,667.

(30) Foreign Application Priority Data

Dec. 9, 1997 (JP) .............................. 9-338823

(51) Int. Cl.[7] ................................ G11B 5/09
(52) U.S. Cl. ................. 369/47.35; 369/47.28
(58) Field of Search ................ 369/44.34, 44.35, 369/47.23, 47.24, 47.28, 47.35, 53.34, 59.21, 124.14, 59.19

(56) References Cited

U.S. PATENT DOCUMENTS

| | | | |
|---|---|---|---|
| 4,663,751 A | 5/1987 | Kaku et al. | |
| 4,695,993 A | 9/1987 | Takagi et al. | |
| 5,297,115 A | 3/1994 | Poon et al. | |
| 5,477,512 A | 12/1995 | Kubo et al. | |
| 5,602,812 A | * 2/1997 | Miura et al. | 369/47.3 |
| 5,684,769 A | 11/1997 | Kaneko | |
| 5,694,382 A | 12/1997 | Oliver et al. | |

FOREIGN PATENT DOCUMENTS

| | | |
|---|---|---|
| EP | 0 727 782 A1 | 8/1996 |
| JP | 58072386 | 4/1983 |
| JP | 61 017271 | 1/1986 |
| JP | 61028220 | 2/1986 |
| JP | 61 080668 | 4/1986 |
| JP | 62262276 | 11/1987 |
| JP | 08124238 | 5/1996 |
| JP | 10 064070 | 3/1998 |

* cited by examiner

Primary Examiner—Paul W. Huber
(74) Attorney, Agent, or Firm—Parkhurst & Wendel, L.L.P.

(57) ABSTRACT

An optical disc recording and reproducing apparatus for recording and reproducing data in and from an optical disc by the use of the optical disc as a recording medium, comprises analog processing means including a binarization unit for subjecting a signal read from the optical disc to binarization and a servo unit for controlling recording and reproducing a signal in and from the optical disc; synchronous clock generating means for generating a synchronous clock signal which is synchronized with the signal read from the optical disc; address detecting means for detecting address information indicating a physical position on the optical disc based on the signal read from the optical disc, and outputting a signal indicating the address information and a signal indicating that the address has been detected when the address information has been detected; a sector counter for holding a sector count value of a sector as a recording unit on the optical disc, and updating the sector count value according to the synchronous clock signal and the signal output from the address detecting means; and gate signal generation switching means for generating gate a signal which controls the analog processing means, based on one of the sector count value held in the sector counter and information obtained from the analog processing means, according to the signal indicating that the address has been detected, which is output from the address detecting means.

6 Claims, 4 Drawing Sheets

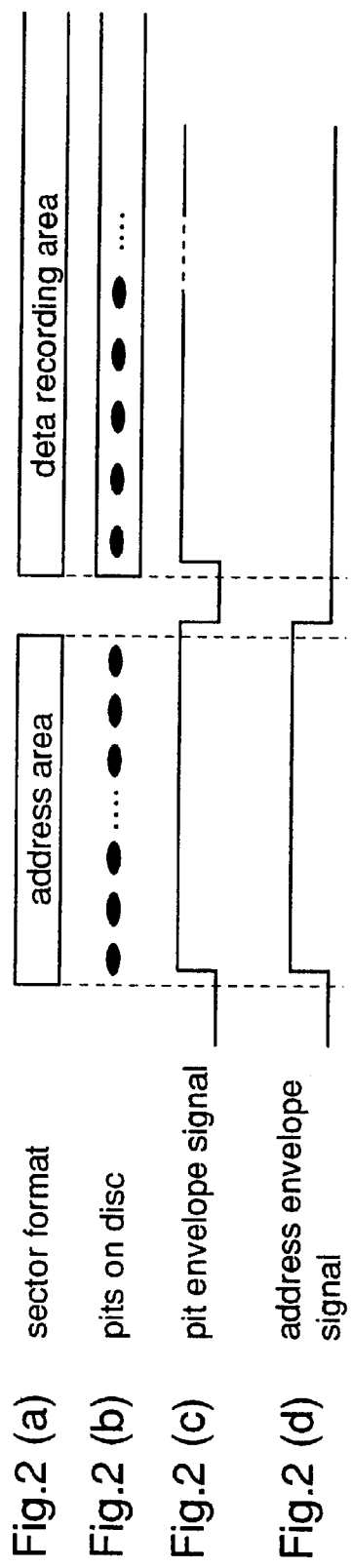

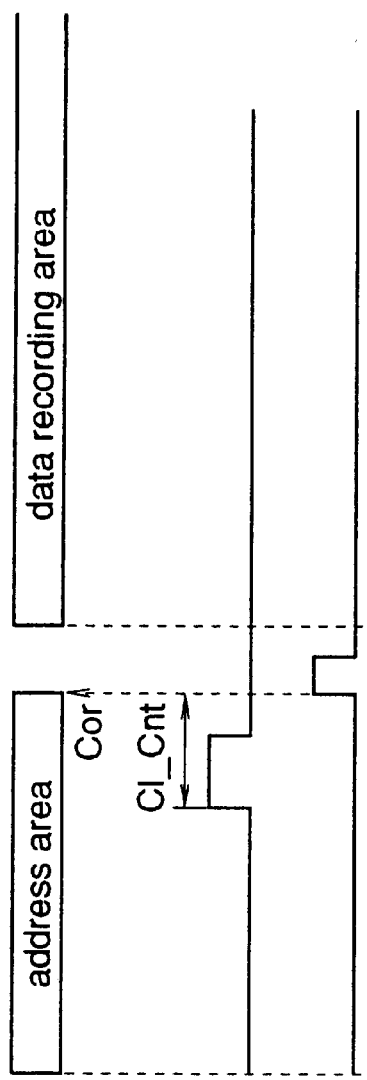

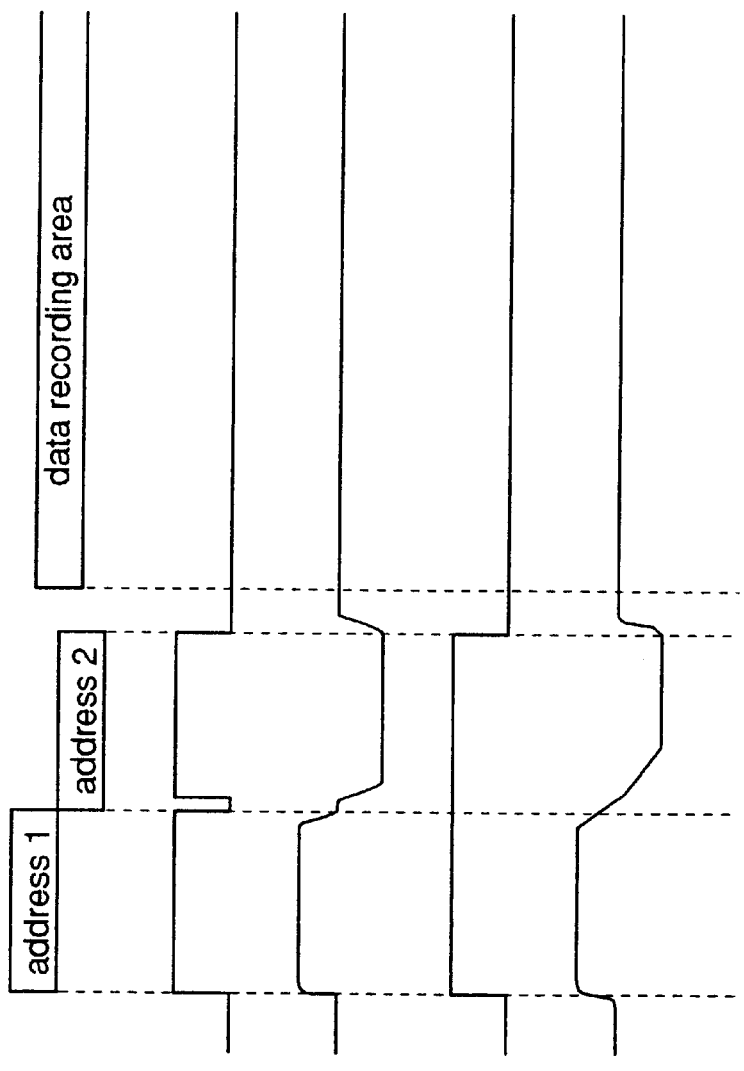

OPTICAL DISC RECORDING AND REPRODUCING APPARATUS HAVING AUTOMATIC GATE SIGNAL GENERATION MODES

This is a divisional of application Ser. No. 09/206,953 filed Dec. 8, 1998, now U.S. Pat. No. 6,459,667.

FIELD OF THE INVENTION

The present invention relates to an optical disc recording and reproducing apparatus and, more particularly to an optical disc recording and reproducing apparatus which uses an optical disc of a large capacity which requires high precision in control of recording and reproduction, as a recording medium.

BACKGROUND OF THE INVENTION

The optical disc is a general term of disc-shaped recording media such as a compact disc, a video disc, a phase-change optical disc, a DVD (digital video disc), and the like, which reflect laser beams on recording surfaces thereof, and read recorded signals by the use of reflected beams.

There are read-only and recordable optical discs. The recordable optical disc includes a WORM(Write Once, Read Many) disc and a rewritable disc. CD-ROMs (Compact Disc Read-Only Memories) are typical of the read-only disc. Manufacturers record data such as video, audio, or characters, computer programs, and the like in the CD-ROMs as signals, and distributes them for sale. Users utilize them by reproducing their recorded contents therefrom. Since the WORM disc with a WORM capability and without capabilities of erasing and altering written data, and the rewritable disc with capabilities of erasing and altering written data, can be used to record data therein and can be accessed randomly by users, and are relatively high-speed and large-capacity recording media, they are suitable for use in recording video data or audio data, or suitable for a storage in a computer system.

In the optical disc, as in the case of a magnetic disc recording medium such as a floppy disc or a hard disc, the recording surface on the disc has concentric circular tracks and linear areas in the radial direction thereof, i.e., sectors, which are managed as unit areas, and address information relating to addresses is recorded in specific recording positions indicated by the addresses.

An optical disc recording and reproducing apparatus according to the prior art which records data in the optical disc and reproduces data therefrom, uses an optical head which converges the laser beams to the recording surface thereby reading a signal recorded therein. To read recorded contents including address information, it is required that the optical head be moved to an appropriate position on the recording surface with high precision. For this purpose, feed back control is performed, including tracking control for positioning the head in a desired position of the disc or control of disc rotation for recording/reproduction, as in the case of the magnetic disc medium.

In addition to these control, the apparatus which uses the optical disc requires focusing control for appropriately converging the laser beams to the recording surface, and laser power control for adjusting intensity of the laser beams. Hence, the optical disc reproducing and recording apparatus according to the prior art obtains a tracking error signal or a focus error signal from the reflected beam, and based on these signals, a servo system performs feedback control of the position of the optical head or the laser power. Likewise, the servo system performs the feedback control to rotation of the disc by the servo system.

The optical disc is basically used to record a digital signal therein as a recording medium. The signal recorded in the optical disc is reproduced by irradiating "pits" formed on the optical disc with a laser beam and reading variations in the intensity of the reflected beam of microscopic signals. In this case, because of optical or electrical low-pass frequency characteristics in a reproducing system, even though data has been digitally recorded in the optical disc, reproduced waveform thereof becomes analog signals having intermediate values.

Accordingly, the optical disc recording and reproducing apparatus according to the prior art which performs the control described above, subjects the signal read from the optical disc to binarization, and performs various types of control processes by using the analog processing system and the digital processing system which handles the binarized digital signal and performs highly precise and high-speed processing.

With recent remarkable development of multi media or computers, optical disc recording media of higher density and larger capacities have been developed. The higher density recording requires more highly precise control, while a demand for higher-speed processing goes on increasing. Accordingly, there is a need for an optical disc recording and reproducing apparatus which can handle a large-capacity optical disc recording medium that is capable of executing more highly precise control and performing higher-speed processing including control than the prior art apparatus.

As the large-capacity optical disc, there has emerged an optical disc which employs a recording method different from that of a conventional optical disc recording medium. While the conventional optical disc medium generally has grooves along tracks, and contains signals recorded in either of convex and concave portions thereof, some optical discs contain signals recorded in both portions. This type of optical disc generally has address areas in which respective address information is recorded for recording in the convex and concave portions, and further, the address areas have been utilized as those having both areas of convex and concave portions, to increase recording capacities. In this optical disc, the address area has no grooves described above, and therefore, the address area and the other recording area must be controlled in different manners.

However, the optical disc recording and reproducing apparatus according to the prior art, is not capable of performing high-speed and highly precise control for the large-capacity recording medium, and has difficulty in appropriately changing control of the optical disc which has the address area and the other area, the structures of which differ from each other.

SUMMARY OF THE INVENTION

It is an object of the present invention to provide an optical disc recording and reproducing apparatus which is capable of executing highly precise control, thereby recording and reproducing data speedily, by the use of a high-density and large-capacity optical disc as a recording medium.

It is another object of the present invention to provide an optical disc recording and reproducing method which is capable of executing highly precise control, thereby recording and reproducing data speedily, when recording a signal and reproducing a recorded signal by the use of the high-density and large-capacity optical disc as the recording medium.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, an optical disc recording and reproducing apparatus for recording and reproducing data in and from an optical disc by the use of the optical disc as a recording medium, comprises: analog processing means including a binarization unit for subjecting a signal read from the optical disc to binarization and a servo unit for controlling recording and reproducing a signal in and from the optical disc; synchronous clock generating means for generating a synchronous clock signal which is synchronized with the signal read from the optical disc; address detecting means for detecting address information indicating a physical position on the optical disc based on the signal read from the optical disc, and outputting a signal indicating the address information and a signal indicating that the address has been detected when the address information has been detected; a sector counter for holding a sector count value of a sector as a recording unit on the optical disc, and updating the sector count value according to the synchronous clock signal and the signal as an output from the address detecting means; and gate signal generation switching means for generating a gate signal which controls the analog processing means, based on one of the sector count value held in the sector counter and information obtained from the analog processing means, according to the signal indicating that the address has been detected, which is output from the address detecting means. Thereby, according to the detection of the address, switching is performed so that the gate signal for controlling the analog processing system is based on the sector counter value or based on the information obtained from the analog processing system.

According to a second aspect of the present invention, in the optical disc recording and reproducing apparatus of the first aspect, the information from the analog processing means which is obtained by the gate signal generation switching means is an envelope signal indicating existence of a signal on the optical disc, which is generated by the binarization unit. Thereby, according to the detection of the address, switching is performed so that the gate signal for controlling the analog processing system is based on the sector counter value or based on the envelope signal.

According to a third aspect of the present invention, an optical disc recording and reproducing apparatus for recording and reproducing data in and from an optical disc by the use of the optical disc as a recording medium, comprises analog processing means including a binarization unit for subjecting a signal read from the optical disc to binarization and a servo unit for controlling recording and reproducing a signal in and from the optical disc; synchronous clock generating means for generating a synchronous clock signal which is synchronized with the signal read from the optical disc; and clock selecting means for selecting one of the synchronous clock signal and a clock signal based on the information obtained from the analog processing means, and outputting the selected clock signal as a selection clock signal used for controlling the analog processing means. Thereby, depending upon the generation of the clock signal, switching of the clock signal for use in control is performed between the synchronous clock signal and the signal based on the information obtained from the analog processing system.

According to a fourth aspect of the present invention, in the optical disc recording and reproducing apparatus of the third aspect, the information from the analog processing means which is obtained by the clock selecting means is a rotation clock signal based on the rotation of the optical disc, which is generated by the servo unit. Thereby, depending upon the generation of the clock signal, switching of the clock signal for use in control is performed between the synchronous clock signal and the rotation clock signal.

According to a fifth aspect of the present invention, the optical disc recording and reproducing apparatus of the third aspect further comprises: a sector counter for holding a sector count value of a sector as a recording unit on the optical disc, and updating the sector count value according to the selection clock signal and a signal output from address detecting means; and gate signal generation switching means for generating a gate signal which controls the analog processing means based on the sector count value held in the sector counter, according to a signal indicating that an address has been detected, which is output from the address detecting means, wherein the gate signal generation switching means, when the clock selecting means has performed switching between the clock signals, does not generate the gate signal based on the sector count value until it receives the signal indicating that the address has been detected, as an input. Thereby, immediately after switching of selection of the clock signal has been performed, the gate signal for controlling the analog processing system generated based on the sector counter value is not used.

According to a sixth aspect of the present invention, an optical disc recording and reproducing apparatus for recording and reproducing data in and from an optical disc by the use of the optical disc as a recording medium, comprises analog processing means including a binarization unit for subjecting a signal read from the optical disc to binarization and a servo unit for controlling recording and reproducing a signal in and from the optical disc; synchronous clock generating means for generating a synchronous clock signal which is synchronized with the signal read from the optical disc; address detecting means for detecting address information indicating a physical position on the optical disc based on the signal read from the optical disc, and outputting a signal indicating the address information and a signal indicating that the address has been detected when the address information has been detected; a sector counter for holding a sector count value of a sector as a recording unit on the optical disc, and updating the sector count value according to the synchronous clock signal and the signal output from the address detecting means; gate signal generation switching means for generating a gate signal which controls the analog processing means, based on the sector count value held in the sector counter according to the signal indicating that the address has been detected, which is output from the address detecting means; and flag generating means for supervising generation of the gate signal by the gate signal generation switching means, and updating of the sector count value by the sector counter, generating a flag indicating reliability of the output position of the gate signal, and outputting the flag to the analog processing means. Thereby, when the gate signal for controlling the analog processing system is generated, relationship between the gate signal and updated sector counter value is checked, and the information about of reliability of the output position of the gate signal is transmitted to the analog processing system.

According to a seventh aspect of the present invention, in the optical disc recording and reproducing apparatus of the sixth aspect, the analog processing means decides whether or not to perform processing in accordance with the gate signal, from the flag. Thereby, the processing is performed depending upon the reliability of the output position of the transmitted gate signal.

According to an eighth aspect of the present invention, an optical disc recording and reproducing apparatus for recording and reproducing data in and from an optical disc by the use of the optical disc as a recording medium, comprises analog processing means for subjecting the signal read from the optical disc to binarization and controlling recording and reproducing a signal in and from the optical disc in analog processing; and gate signal generation switching means for generating a gate signal which instructs the analog processing means to perform switching of gain to be used therein, depending upon a reading result of a signal from the optical disc. Thereby, depending upon the reading result, switching of gain for feedback control is performed.

According to a ninth aspect of the present invention, in the optical disc recording and reproducing apparatus of the eighth aspect, the optical disc has an address area in which address information indicating a physical position on the optical disc is recorded, the address information being recorded in different states in the address area, and the gate signal generation switching means instructs the analog processing means to perform the switching, according to difference between recording states of the address information. Thereby, depending upon the recording states of the address information, switching of gain for feedback control is performed.

According to a tenth aspect of the present invention, an optical disc recording and reproducing method for recording and reproducing data in and from an optical disc by the use of the optical disc as a recording medium, comprises: an analog processing step including a binarization process for subjecting a signal read from the optical disc to binarization and a servo control process for controlling recording and reproducing a signal in and from the optical disc; a synchronous clock generating step for generating a synchronous clock signal which is synchronized with the signal read from the optical disc; an address detecting step for detecting address information indicating a physical position on the optical disc based on the signal read from the optical disc, and outputting a signal indicating the address information and a signal indicating that the address has been detected when the address information has been detected; a sector counter step for holding a sector count value of a sector as a recording unit on the optical disc, and updating the sector count value according to the synchronous clock signal and the signal output in the address detecting step; and a gate signal generation switching step for generating a gate signal which controls the analog processing step, based on one of the sector count value held in the sector counter step and information obtained in the analog processing step, according to the signal indicating that the address has been detected, which is output in the address detecting step. Thereby, according to the detection of the address, switching is performed so that the gate signal for controlling the analog processing system are based on the sector counter value or based on the information obtained from the analog processing system.

According to an eleventh aspect of the present invention, in the optical disc recording and reproducing method of the tenth aspect, the information from the analog processing step obtained in the gate signal generation switching step is an envelope signal indicating existence of a signal on the optical disc, which is generated by the binarization process. Thereby, according to the detection of the address, switching is performed so that the gate signal for controlling the analog processing system is based on the sector counter value or based on the envelope signal.

According to a twelfth aspect of the present invention, an optical disc recording and reproducing method for recording and reproducing data in and from an optical disc by the use of the optical disc as a recording medium, comprises: an analog processing step including a binarization process for subjecting a signal read from the optical disc to binarization and a servo control process for controlling recording and reproducing a signal in and from the optical disc; a synchronous clock generating step for generating a synchronous clock signal which is synchronized with the signal read from the optical disc; and a clock selecting step for selecting one of the synchronous clock signal and a clock signal based on the information obtained in the analog processing step, and outputting the selected clock signal as a selection clock signal used for controlling the analog processing step. Thereby, depending upon the generation of the clock signal, switching of the clock signal for use in control is performed between the synchronous clock signal and the signal based on the information obtained from the analog processing system.

According to a thirteenth aspect of the present invention, in optical disc recording and reproducing method of the twelfth aspect, the information from the analog processing step which is obtained in the clock selecting step is a rotation clock signal based on the rotation of the optical disc which is generated by the servo control process. Thereby, depending upon the generation of the clock signal, switching of the clock signal for use in control is performed between the synchronous clock signal and the rotation clock signal.

According to a fourteenth aspect of the present invention, the optical disc recording and reproducing method of the twelfth aspect further comprises: a sector counter step for holding a sector count value of a sector as a recording unit on the optical disc, and updating the sector count value according to the selection clock signal and a signal output in an address detecting step; and a gate signal generation switching step for generating a gate signal which controls the analog processing step based on the sector count value held in the sector counter step, according to a signal indicating that an address has been detected, which is output in the address detecting step, wherein in the gate signal generation switching step, when the clock selecting step has performed switching between the clock signals, the gate signal is not generated based on the sector count value until the signal indicating that the address has been detected is input. Thereby, immediately after switching of selection of the clock signal has been performed, the gate signal for controlling the analog processing system generated based on the sector counter value is not used.

According to a fifteenth aspect of the present invention, an optical disc recording and reproducing method for recording and reproducing data in and from an optical disc by the use of the optical disc as a recording medium, comprises: an analog processing step including a binarization process for subjecting a signal read from the optical disc to binarization and a servo control process for controlling recording and reproducing a signal in and from the optical disc; a synchronous clock generating step for generating a synchronous clock signal which is synchronized with the signal read from the optical disc; an address detecting step for detecting address information indicating a physical position on the optical disc based on the signal read from the optical disc, and outputting a signal indicating the address information and a signal indicating that the address has been detected when the address information has been detected; a sector counter step for holding a sector count value of a sector as a recording unit on the optical disc, and updating the sector count value according to the synchronous clock signal and the signal output in the address detecting step; a gate signal generation switching step for generating a gate signal which control the analog processing step, based on the sector count value held in the sector counter step, according to the signal indicating that the address has been detected, which is output in the address detecting step; and a flag generating step for supervising generation of the gate signal in the gate signal generation switching step, and updating of a sector count value in the sector counter step, generating a flag indicating reliability of the output position of the gate signal, and outputting the flag to the analog processing step. Thereby, when the gate signal for controlling the analog processing system is generated, relationship between the gate signal and the updated sector counter value is checked, and the information about of reliability of the output position of the gate signal is transmitted to the analog processing system.

According to a sixteenth aspect of the present invention, in the optical disc recording and reproducing method of the fifteenth aspect, in the analog processing step, it is decided whether or not to perform processing in accordance with the gate signal, from the flag. Thereby, the processing is performed depending upon the reliability of the output position of the transmitted gate signal.

According to a seventeenth aspect of the present invention, an optical disc recording and reproducing method for recording and reproducing data in and from an optical disc by the use of the optical disc as a recording medium, comprises: an analog processing step for subjecting the signal read from the optical disc to binarization and controlling recording and reproducing a signal in and from the optical disc in analog processing; and a gate signal generation switching step for generating a gate signal which instructs the analog processing step to perform switching of gain to be used therein, depending upon a reading result of a signal from the optical disc. Thereby, depending upon the recording states of the address information, switching of gain for feedback control is performed.

According to an eighteenth aspect of the present invention, in the optical disc recording and reproducing method of the seventeenth aspect, the optical disc has an address area in which address information indicating a physical position on the optical disc is recorded, the address information being recorded in different states in the address area, and the gate signal generation switching step instructs the analog processing step to perform the switching, according to difference between recording states of the address information. Thereby, depending upon the recording states of the address information, switching of gain for feedback control is performed.

BRIEF DESCRIPTION OF THE DRAWINGS

FIGS. 2(a)–(d) are diagrams for explaining an envelope signal for use by the optical disc recording and reproducing apparatus according to the first embodiment.

FIGS. 3(a)–(c) are diagrams for explaining a flag for use by the optical disc recording and reproducing apparatus of the first embodiment.

FIGS. 4(a)–(e) are diagrams for explaining control process by the use of an address gate signal performed by the optical disc recording and reproducing apparatus of the second embodiment.

DETAILED DESCRIPTION OF THE PREFERRED EMBODIMENTS

Embodiment 1

Figure 1:
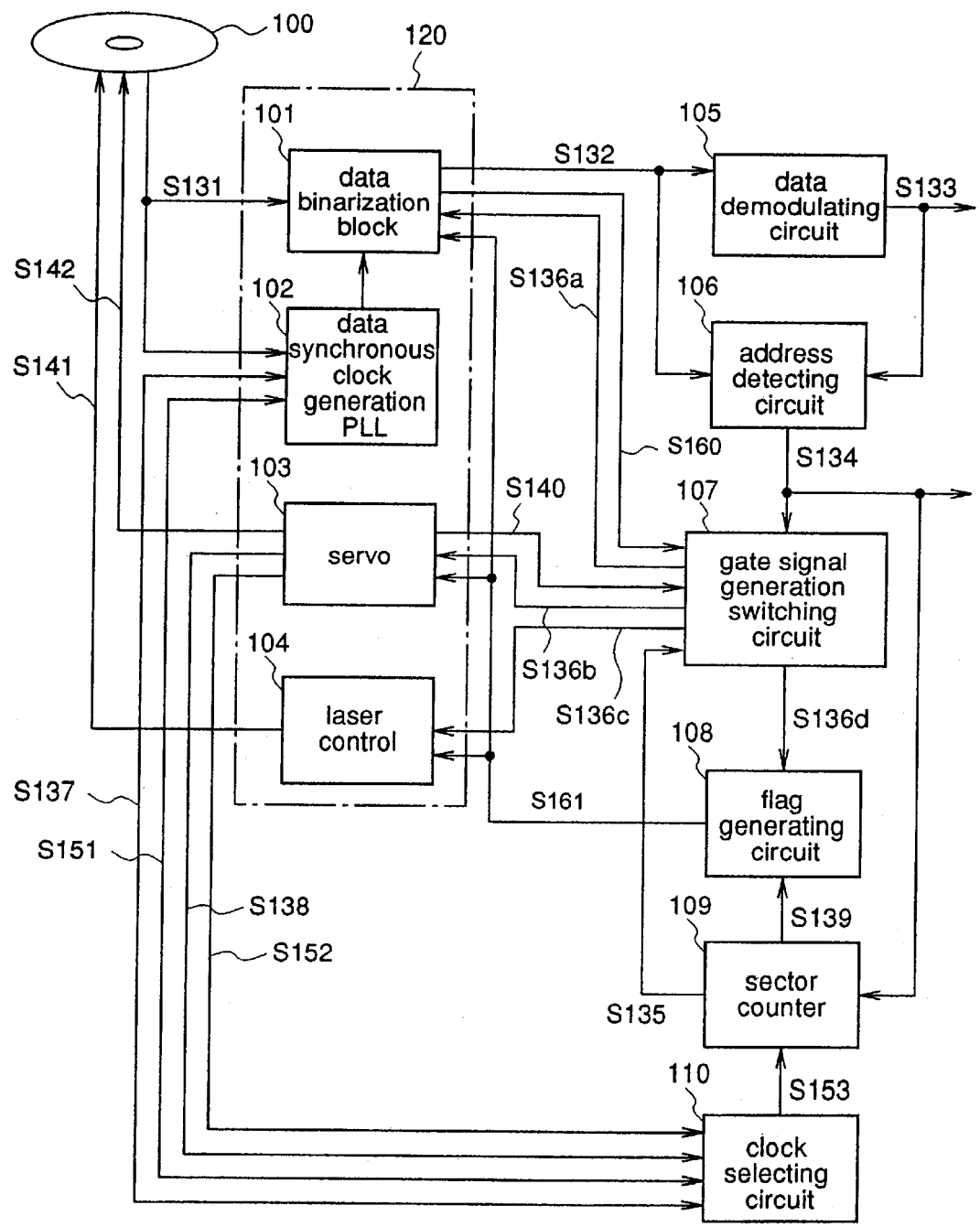
FIG. 1 is a block diagram showing an optical disc recording and reproducing apparatus according to a first and second embodiment of the present invention.

In an optical disc recording and reproducing apparatus according to a first embodiment of the present invention, a control signal is generated based on a signal obtained from an analog processing system and a signal obtained from a digital processing system, and control is performed by the use of the control signal.

FIG. 1 is a block diagram showing a construction of the optical disc recording and reproducing apparatus of the first embodiment. A description will be given of the construction of the apparatus. Turning to FIG. 1, the optical disc recording and reproducing apparatus comprises an optical disc drive 100, an analog processing system 120, a data demodulating circuit 105, an address detecting circuit 106, a gate signal generation switching circuit 107, a flag generating circuit 108, a sector counter 109, and a clock selecting circuit 110. The analog processing system 120 comprises a data binarization block 101, a data synchronous clock generation PLL (phase-locked loop) 102, a servo 103, and a laser control 104.

The optical disc drive 100 is provided with a motor which rotates an optical disc as a recording medium, and an optical head which records (write) data in the optical disc and reproduces (reads) data therefrom by the use of laser beams, under the control of the analog processing system 120.

As in the case of the prior art apparatus, the signal recorded in the optical disc is input to the analog processing system 120, and is subjected to binarization, resulting in a binarized digital signal. The binarization block 101 is used for performing binarization to a signal S131 read from the optical disc which is output from the optical disc drive 100, to generate a binarized signal S132 which takes a value "0" or "1". The data synchronous clock generation PLL 102 is used for performing PLL process by the use of the read signal S131 to generate a synchronous clock signal S137 which is synchronized with the input signal S131.

The servo 103 is used for outputting a control signal S142 to the optical disc drive 100 in accordance with a gate signal S136b, thereby performing focusing control which controls a focal point, tracking control which controls positioning the optical head in a desired recording position on the optical disc, and control of rotation of the optical disc. The laser control 104 is used for outputting a control signal S141 to the optical disc drive 100 in accordance with a gate signal S136c, thereby controlling intensity of laser light used in recording and reproducing data in and from the optical disc.

The data demodulating circuit 105 is used for demodulating modulated data to generate data before modulation. This demodulation is performed to the signal S132 based on modulated data in a way adapted to the modulation, in order to reduce DC (direct current) components, when writing to the optical disc is performed. The resulting demodulated signal S133 is based on the data recorded in either of the optical disc and address information thereon.

The address detecting circuit 106 is used for receiving the demodulated signal S133 based on the address information as an input and detecting address information of a sector on the optical disc which is to be read.

The gate signal generation switching circuit 107 is used for generating a gate signal by which the analog processing system 120 is controlled, and outputting the gate signal to the data binarization 101, the servo 103, and the laser control 104 in the analog processing system 120. The gate signal serves as a control signal. One of the roles of the gate signal is to instruct the analog processing system 120 to perform switching between modes, so as to perform appropriate processing for the recording areas. On the optical disc used in the recording and reproducing apparatus of the first embodiment, there are provided a sector as a data recording area in which data is recorded, and a sector as an address area in which address information indicating addresses is recorded. The address area is formed when creating the optical disc, and significantly differ from the data recording area in a reflectance, a recording format (storage state of a signal indicating "0" or "1"), or the existence/non-existence of guide grooves. For this reason, it is required that the processing to the address area performed by the analog processing system 120 differ from the processing to the data recording area performed by the same. In the optical disc recording and reproducing apparatus of the first embodiment, the gate signal is used to control switching between these processing performed by the analog processing system 120. In accordance with the gate signal, the analog processing system 120 performs switching between an address area processing mode and a data recording area processing mode. The gate signal is also used to transmit the address information which indicates the reading position on the optical disc, to the analog processing system 120.

The flag generating circuit 108 is used for generating a flag indicating reliability of the output position of the gate signal as the control signal to the analog processing system 120. The sector counter 109 is used for holding a sector count value indicating a physical position on the optical disc, and updating the sector count value according to a selection clock signal input from the clock selecting circuit 110 and an address detection signal input from the address detecting circuit 106.

The clock selecting circuit 110 is used for selecting one of the synchronous signal generated by the data synchronous clock generation PLL 102 and a fixed clock generated by the servo 103, and outputting the selected clock signal to the sector counter 110.

Hereinafter, a description will be given of operation of reproducing data from the optical disc performed by the optical disc recording and reproducing apparatus of the first embodiment so constructed as "A. Basic Operation", "B. Control by the Use of Envelope Signal", "C. Clock Switching", "D. Control By Use of Flag". The description will be in large part given of control in the analog processing system 120.

A. Basic Operation

When data reproduction from the optical disc starts, the optical disc is rotated and the tracking central is executed under the control of the servo 103. The servo 103 outputs a tracking OK signal S140 to the gate signal generation switching circuit 107. Receiving the tracking OK signal S140, the gate signal generation switching circuit 107 generates gate signals S136a-S136c in accordance with which processing is performed in an address processing mode, and outputs these signals to the data binarization block 101, the servo 103, and the laser control 104 in the analog processing system 120. The analog processing system 120 enters the address area processing mode. Since no guide grooves are provided in the address area, the servo 103 holds tracking. The laser control 104 performs control so that laser power for the address area is appropriately used in the optical disc drive 100.

The optical disc drive 100 reads the signal as the address information recorded in the optical disc. The read signal S131 is input to the data binarization block 101 and the data synchronous clock generation PLL 102 in the analog processing system 120. The data binarization block 101 subjects the signal S131 to binarization, and outputs the resulting binarized signal S132 to the data demodulating circuit 105. The data demodulating circuit 105 demodulates the binarized signal S132, and outputs the resulting demodulated signal S133 to the address detecting circuit 106. The address detecting circuit 106 detects an address of the input signal S133, and outputs an address signal S134 indicating the address has been detected and address information when the address information has been detected, to the gate signal generation switching circuit 107 and the sector counter 109. In the optical disc for use by the first embodiment, according to a general format, the address information contains specific mark data termed an "address mark". The address detecting circuit 106 detects the address information by using the address mark in the demodulated signal S133 as an indication. Following the address information, an error detection code used for detection of correctness/incorrectness of the address information is present. According to the error detection code, the address detecting circuit 106 detects an error.

Receiving the read signal S131, the data synchronous clock generation PLL 102 performs PLL process, to generate the synchronous clock signal S137 which is synchronized with the input signal S131. The data synchronous clock generation PLL 102 generates a PLL synchronization OK signal S151 indicating that the PLL process has been performed, and outputs the OK signal S151 and the synchronous clock signal S137 to the clock selecting circuit 110. The clock selecting circuit 110 selects the synchronous clock signal S137 when the PLL synchronization OK signal S151 indicating synchronization is input thereto, and outputs the synchronous clock signal S137 to the sector counter 109 as the selected clock signal S153.

Receiving the selected clock signal S153 and the address signal S134 as inputs, a correct sector count value is preset in the sector counter 109. The sector counter 109 outputs a counter synchronization timing signal S135 based on the sector counter value preset correctly to the gate signal generation switching circuit 107. Thereafter, the sector counter 109 updates a sector count value according to the selected clock signal S153, and outputs the counter synchronization timing signal S135 based on the updated sector count value to the gate signal generating circuit 107. Therefore, when reading for continuous areas is performed after the sector count value has been correctly preset, updated sector count values transmit correct address position information.

Receiving the signal S134 from the address detection circuit 106 and the counter synchronization timing signal S135 from the sector counter 109 as inputs, the gate signal generation switching circuit 107 generates a signal designating the data recording area mode, and outputs the gate signals S136a-s136c including the signal and a signal indicating address information based on the signal S135, to the analog processing system 120. The analog processing system 120 enters the data recording area mode. The servo 103 releases a "Hold" state of tracking, and then performs feedback control for the data recording area. The laser control 104 performs control so that the laser power for the data recording area is appropriately used. In this manner, the address position information of the data which is to be read is obtained, and data can be reproduced appropriately.

The signal S131 based on the data which has been read from the data recording area is also subjected to binarization by the data binarization block 101, and demodulated by the data demodulating circuit 105. The resulting signal is output as the output of the optical disc recording and reproducing apparatus. The address signal S134 containing the address information which has been detected by the address detecting circuit 106 can also be used externally as the output of the apparatus.

On the other hand, when the address detecting circuit 106 has not detected the address, the sector counter 109 updates the sector count value according to the synchronous clock signal, and outputs the counter synchronization timing signal S135 based on the updated sector counter value to the gate signal generation switching circuit 107. The switching circuit 107 generates the gate signals S136*a*-S136*c* indicating address position information based on the signal S135 and outputs these signals to the analog processing system 120. The analog processing system 120 performs reading from the optical disc while maintaining the address area mode. Updating the sector count value and reading in accordance with the gate signal based on the updated sector count value are repeated until the address is detected.

B. Control by Use of Envelope Signal

In "A. Basic Operation", desired address information is obtained speedily. However, this sometimes becomes impossible. For instance, immediately after reading from the optical disc has started, or when reading cannot be performed smoothly due to the flaw of the optical disc surface, the address information is not obtained speedily.

In such cases, assuming now that operation shown in "A. Basic Operation" is performed until the address detecting circuit 106 has detected the address, the operation is carried out under poor feedback control in the state where the analog processing system 120 is in the address area mode and the servo 103 holds tracking, whereby some time elapses due to delay caused by the poor control until the address is detected. Moreover, in some cases, addresses cannot be detected continuously, and the sector count value held in the sector counter 109 becomes significantly different from the correct address value. In such cases, since the gate signal based on the sector counter value which is significantly different from the correct value, is output, poor tracking control occurs in the analog processing system 120. If the system 120 returns to the initial state, and retries the initial tracking operation again, then more and more time becomes necessary.

In the optical disc recording and reproducing apparatus according to the first embodiment, the analog processing system 120 outputs the envelope signal indicating the position of a signal, and the gate signal generation switching circuit 107 performs switching between the gate signal based on the sector count value and the gate signal based on the envelope signal, to be output, depending upon the reading result the address information.

The data binarizatian block 101 generate an envelope signal S160 indicates that pits are present on the optical disc, and outputs the envelope signal S160 to the gate signal generation switching circuit 107. The envelope signal S151 contains a pit envelope signal indicating that the pita are present in the address area or the data recording area on the optical disc, and an address envelope signal indicating that the pits are present in the address area. As mentioned previously, since there is difference of reflectances between the address area and the data recording area, the data binarization block 101 generates the pit envelope signal and the address envelope signal based on the difference.

FIG. 2 is a conceptual diagram showing storage state of a signal on the optical disc. In the figure, a) shows a sector format showing a structure of the recording area on the optical disc. As described above, the address area and the data recording area are provided. In the same figure, b) shows the state of the pits, c) shows the pit envelope signal, and d) shows the address envelope signal. As can be seen from the figure, the pit envelope signal is output at H (high) level when the pits are present in either of the address area and the data recording area, and the address envelope signal is output at H(high) level only when the pits are present in the address area.

The gate signal generation switching circuit 107 of the first embodiment includes a state transition machine, for supervising detection of an address, and performing switching between the gate signal based on the sector count value and the gate signal based on the envelops signal, depending upon the detection. When a state transition condition is set, for example, by receiving the tracking OK signal S140 as an input, the circuit 107 outputs the signal for instructing the analog processing system 120 to perform processing in the address area mode, and thereafter, if the address has not been detected in a predetermined number of sectors, then the circuit 107 carries out switching, thereby performing control by the use of the gate signal based on the envelope signal S160.

When the analog processing system 120 is reading data from the data recording area while raining in the address area mode, in the operation shown in "A. Basic Operation", after the address has not been detected in the predetermined number of sectors, the gate signal generation switching circuit 107 performs switching so that the gate signal is generated based on the envelope signal S160 as described above. In this case, as for the envelope signal S160, the level of the pit envelop, signal in FIG. 2(*c*) is H, while the level of the address envelope signal in FIG. 2(*d*) is L (low). Sine the envelope signal S160 is generated by the analog processing system 120, and therefore contains noise and the like, the gate signal generation switching circuit 107 eliminates the noise contained therein, and then generates the gate signals S136*a*–136*c* based on this, and outputs these signals to the analog processing system 120, in accordance with which, the system 120 enters the data recording area mode. The servo 103 releases the "TRACKING HOLD", and executes the feedback control smoothly. Thereby, the analog processing system 120 performs appropriate processing, and adverse effects on the control system due to delay of address detection is avoided.

Rather than control by the use of the gate signal based on the envelope signal generated by the analog processing system, it is preferable to perform control by the use of the gate signal based on the sector count value generated by the digital processing system, because the control is carried out with high precision. It is therefore desirable for the gate signal generation switching circuit 107 to set the state transition condition in the state transition machine so that the control in the digital system is performed with priority.

In the first embodiment, the envelope signal is output from the analog processing system 120 to the gate signal generation switching circuit 107, and the analog processing system 120 is controlled by the digital gate signal. Although it is possible that the data binarization block 101 generates the envelope signal, which is used in the analog processing system 120 to perform analog control, control in the digital system is more preferable in the whole system as described above. Hence, to switch from the analog control to the digital control with the above construction, the signal indicating that the address has been detected is also input to the analog processing system 120, to perform switching therein, causing the control system to be more complicated. As a solution to this, in the first embodiment, the envelope signal S160 is input to the gate signal generation switching circuit 107, to manage the control signal therein unifyingly.

C. Clock Switching

While the signal is read from the optical disc smoothly and the data synchronous clock generation PLL 102 smoothly generates the synchronous clock signal S137 in the "A. Basic Operation", the signal to-be-processed by the PLL 102 runs out if the optical disc drive 100 reads data from areas in which no data is recorded. In this state, the PLL 102 holds PLL process, and outputs an oscillation frequency as a fixed output obtained by system setting.

In this "HOLD" state, if some fluctuations in rotation of the disc occur, the clock signal to be in synchronization is sometimes lacking in synchronization due to the fluctuations. In this case, the sector counter 109 updates the sector count value by the use of the clock signal lacking in synchronization, and correspondingly precision of control based on the sector count value is degraded, which makes it impossible to detect the address or reproduce recorded data successfully.

In the first embodiment, the servo 103 generates a rotation clock signal S138, i.e., a clock signal based on rotation of the optical disc. The clock selecting circuit 110 selects one of the synchronous clock signal S137 and the rotation clock signal S138, and outputs the selected signal to the sector counter 109. The rotation clock signal S138 is used to avoid the state with low controllability when the reliability of the synchronous clock signal S137 is low.

The servo 103 controls rotation of the optical disc drive 100 as described above, generates the rotation clock signal S138 based on the rotation of the optical disc, and outputs the rotation clock signal S138 to the clock selecting circuit 110. In addition, the servo 103 supervises rotational stability. When rotation is stable, the servo 103 generates a rotation OK signal S152 indicating this, and outputs the OK signal S152 and the rotation clock signal S138 to the clock selecting circuit 110.

The data synchronous clock generating circuit PLL 102 receives the read signal S131 as an input, and when the PLL 102 executes PLL control and generates the synchronous clock signal S137, the PLL 102 generates a PLL synchronization OK signal S151 indicating synchronization, and outputs the OK signal S151 and the synchronous clock signal S137 to the clock selecting circuit 110. On the other hand, when the PLL 102 does not generate the signal synchronized with the read signal S131, which is positioned in the area where no data is recorded as described above, it outputs the clock signal S137 based on the fixed frequency to the clock selecting circuit 110 instead of outputting the PLL synchronization OK signal S151.

When the PLL synchronization OK signal S151 indicates synchronization in the PLL102, the clock selecting circuit 110 selects the synchronous clock signal S137, and outputs the synchronous clock signal S137 to the sector counter 109 as the selection clock signal S153. Use of the synchronous clock signal S137 provides higher precision in control than use of the rotation clock signal S138 generated by the analog processing system 120. For this reason, the clock selecting circuit 110 selects the synchronous clock signal S137 regardless of the state of the rotation OK signal S152, when the PLL synchronization OK signal S151 indicates synchronization.

When the intonation indicating synchronization in the PLL 102 is not obtained from the PLL synchronization OK signal S151, the clock selecting circuit 110 checks whether or not the rotation OK signal S152 from the servo 103 indicates that rotation is stable. When the signal S152 indicates that rotation is stable, the clock selecting circuit 110 selects the rotation clock signal S138, and outputs the clock signal S138 to the sector counter 109 as the selection clock signal S153.

When it is decided that neither the PLL synchronization nor rotational stability is obtained, from the PLL synchronization OK signal S151 and the rotation OK signal S152, respectively, the clock selecting circuit 110 selects the synchronous clock signal S137. The synchronous clock signal S137 which is output on a fixed basis is used rather than the rotation clock signal S138, for the time period from when the optical disc starts rotating until it rotates with stability, or the case where fluctuations occur in the rotation of the optical disc for some reason.

In this manner, the clock selecting circuits performs switching between the clock signals S137 and S138 according to the PLL synchronization OK signal S151 and the rotation OK signal S152. However, there is a possibility that the sector count value held in the sector counter 109 is different from the correct value immediately after this switching. As a solution to this, the sector counter 109 of the first embodiment detects switching of the clock signal, and outputs a switching detection signal contained in the counter synchronization timing signal S135 and indicating that the switching has been performed, to the gate signal generation switching circuit 107.

Receiving the switching detection signal as an input, the gate signal generation switching circuit 107 does not use the counter synchronization timing signal S135 containing the switching detection signal, and does not generate the gate signal based on the sector counter value different from the correct value, until it confirms that the signal S134 input from the address detecting circuit 106 indicates that the address has been detected. Receiving the signal indicating that the address has been detected, the gate signal generation switching circuit 107 uses the counter synchronization timing signal S135 to generate the gate signal based on the sector count value, since the sector count value is preset in the sector counter 109 as the correct value.

As already described in the "A. Basic Operation", after the correct value is preset in the sector counter 109, control is performed smoothly by the use of the gate signal based on the sector count value, and thereafter, for data recorded continuously, the sector count value is updated according to the synchronous clock signal, to correctly obtain an address to be subsequently read. On the other hand, when data is not recorded continuously or another read out is performed, after the address is detected in operation shown in A.-C., a correction is made by presetting the correct value in the sector counter 109 again.

After this correction, an appropriate gate signal is output, and thereby control is carried out smoothly. On the other hand, since the gate signal S136 output before the correction has low reliability, if the analog processing system 120 executes control by the use of the gate signal S136, precision in control is reduced.

In the first embodiment, the flag generating circuit 108 supervises the status of the correction, to check whether or not the correction has been made. The circuit 108 generates the flag indicating whether to be according to the gate signal S136 or not, and outputs the flag to the analog processing system 120, thereby improving precision in processing performed by the analog processing system 120.

The flag generating circuit 108 receives a gate generation signal S136d according to the gate signals S136a–136c output to the analog processing system 120 from the gate signal generation switching circuit 107. The flag generating circuit 108 also receives a signal S139 containing a signal indicating that the sector count value has been updated, and a signal indicating that the correction has been made, from the sector counter 109.

FIG. 3 is a diagram for explaining generation of the flag in the flag generating circuit 108. In the figure, like the a) in FIG. 2, a) shows a sector format of the optical disc, b) shows the output state of the gate signal in the gate signal generation switching circuit 107, and c) shows generation of the flag in the flag generating circuit 108.

As can be seen from b), when the gate signal generation switching circuit 107 outputs the gate signal S136, the flag generating circuit 108 to which the signal S136*d* has been input, starts counting operation. This counting operation is carried out according to the signal S139 input from the sector counter 109 when it indicates that the sector count value has been updated, and is continued until the signal S139 indicates that the correction has been made, or the count value has reached a predetermined upper limit.

In the case of b), the correction indicated by "Cor" is made at the end of the address area. The flag generating circuit 108 carries out the counting operation in the areas between "C1_Cnt". The flag generating circuit 108 decides whether or not the resulting count value is within a range indicated by a predetermined threshold. When it is within the range, the flag generating circuit 108 generates the flag shown in c), and outputs the flag S161 to the analog processing system 120.

When the flag S161 is input to the analog processing system 120 during a period after the gate signals S136*a*–S136*c* have been input, it is decided that the sector counter 109 has made the correction immediately after the gate signals S136*a*–S136*c* is output, and accordingly, the analog processing system 120 does not carry out control according to the gate signals S136*a*–S136*c* with low reliability and maintains the control status before the gate signals S136*a*–S136*c* are input, whereas it performs control by the use of the following input gate signals. Thereafter, the gate signal generation switching circuit 107 outputs the gate signals S136*a*–S136*c* based on the correct counter value which has been corrected which is output from the sector counter 109, and by the use of the gate signals, the analog processing system 120 is capable of performing preferable control.

Thus, in accordance with the first embodiment, the optical disc recording and reproducing apparatus comprises the optical disc drive 100, the analog processing system 120, the data demodulating circuit 105, the address detecting circuit 106, the gate signal generation switching circuit 107, the flag generating circuit 108, the sector counter 109, and the clock selecting circuit 110, wherein the signal obtained by the analog system and the signal obtained by the digital system are used to perform control to the analog processing system with high precision depending upon the status of signal processing, thereby allowing speedy data processing.

In addition, in accordance with the optical disc recording and reproducing apparatus of the first embodiment, the sector counter 109 holds and updates the sector count value, the data binarization block 101 in the analog processing system 120 outputs the envelope signal S160 depending upon the status in which the signal is recorded on the optical disc, and the gate signal generation switching circuit 107 generates the gate signals S136*a*–S136*c* based on the sector count value held in the sector counter 109 or the envelope signal. Therefore, even if some delay occurs in reading the address information because control is being performed by the gate signals based on the sector count value, it is possible to avoid adverse effects caused by such delay on the analog processing system 120.

Further, in accordance with the optical disc record Ii reproducing apparatus of the first embodiment, the flag generating circuit 108 generates the flag S161 indicating closeness relationship between the gate signals S136*a*–B136*c* output to the analog processing system 120 and the correction of the sector count value in the sector counter 109, and outputs the flag S161 to the analog processing system 120, which does not perform processing according to the gate signals with low reliability which are output before the sector count value is corrected, to suppress reduction of precision in control.

Still further, while in the first embodiment, the description has been given of the control operation for reproducing data recorded in the optical disc, recording data in the optical disc is controlled with precision in the same manner.

Embodiment 2.

An optical disc recording and reproducing apparatus according a second embodiment of the present invention uses an optical disc having an address area in a recording format which is adapted to a large capacity and a high density, as a recording medium.

The optical disc recording and reproducing apparatus of the second embodiment has a construction identical to that of the first embodiment, and therefore a description will be given with reference to FIG. 1.

In the optical disc recording medium, data is recorded in convex portions and concave portions of grooves along the tracks in the optical disc recording surface, to realize high-density and large-capacity recording. In addition, data is recorded in the address area in the high-density recording format, to realize effective use of a storage area. The optical disc of the second embodiment has also address and data recording areas formed when creating the optical disc, as in the case of the optical disc for use by the first embodiment. The grooves are formed only in the data recording area, and in the convex portions and concave portions thereof, data is recorded. Address recording positions arranged in the address area are shifted from each other so that the address information in the data recording area of the convex portions and the address information in the data recording area of the concave portions share the address area, thereby recording data efficiently.

FIG. 4 is a diagram for explaining a recording method of the optical disc, generation of a gate signal according to a second embodiment, and processing in an analog processing system. In the figure, a) shows a sector format of the optical disc as in the FIGS. 2–3, b) and d) shows the states in which address part gate signals of gate signals output from the gate signal generation switching circuit 107, which instructs the analog processing system 120 to perform processing in the address area mode, are output, and c) and e) show waveform of signal processing performed to the address part gate signals in b) and d) by analog processing system 120.

As shown in a), address information, i.e., addresses 1 and 2, to be recorded are shifted from each other in the address area on the optical disc for use by the second embodiment. In the optical disc recording and reproducing apparatus of the second embodiment, when the address information shifted from each other (addresses 1 and 2) is sequentially read in, the shifted recording position of the address information is detected. Upon the detection, as shown in b), the level of the address part gate information indicating the address area switches from "H" to "L", and maintains "L" for a short period.

The analog processing system 120 in FIG. 1, starts performing high gain control according to the rising of the address part gate signals in 4*b*) and 4*d*), thereby realizing speedy follow-up in the PLL control, and when some leading-in is completed, the control is switched from the high-gain control to low-gain control for the PLL. As shown in d), when the address part gate signal B without this switching for a short period is output, the high-gain control is started according to the rising of the address part gate signal B when performing reading out the address 1, and thereafter, the control is switched from the high-gain control to the low-gain control, and the address 2 is read out. At this time, the low-gain control is performed, and therefore speedy control cannot be performed as can be observed from the analog processing waveform B in e).

On the other hand, the optical disc apparatus of the second embodiment, as shown in b), upon the detection of the shift of the address recording position, the level of the address part gate signal switches from "H" to "L", and maintains "L" for a short period. Hence, according to the second rising of the gate signal A (H level), the analog processing system 120 starts performing the high-gain control. Thereby, as can be observed from the analog processing waveform A shown in c), speedy control can be carried out in contrast with the case in e).

Thus, in accordance with the optical disc recording and reproducing apparatus of the second embodiment having the construction identical to that of the first embodiment, the optical disc having an address area of the high-density recording format is used as the recording medium, the shift of the recording position of the address information in the address area is detected, the level of the address part gate signal contained in the gate signals S136*a*-S136*c* output from the gate signal generation switching circuit 107 is made to switch from "H" to "L" for a short period, thereby realizing speedy follow-up of signal processing in the analog processing system 120. As a result, precision in control is improved and speedy data processing is realized.

As for the analog processing system 120, the data demodulating circuit 105, the address detecting circuit 106, the gate signal generation switching circuit 107, the flag generating circuit 108, the sector counter 109, and the clock selecting circuit 110 shown in the first or second embodiment, the part or the all of which may constitute the same integrated circuit. Besides, as for the optical disc recording and reproducing apparatus of the first or second embodiment, a part or all of the digital processing system including the gate signal generation switching circuit 107 and the sector counter 109, and the analog processing system 120 may constitute the same integrated circuit, and a chip, namely, one or a plurality of integrated circuits, is preferably used in the optical disc drive or the system including necessary input/output devices and the like.

What is claimed is:

1. An optical disc recording and reproducing apparatus for recording and reproducing data in and from an optical disc by the use of the optical disc as a recording medium, said apparatus comprising:

analog processing means including a binarization unit for subjecting a signal read from the optical disc to binarization and a servo unit for controlling recording and reproducing a signal in and from the optical disc;

synchronous clock generating means for generating a synchronous clock signal which is synchronized with the signal read from the optical disc; and clock selecting means for selecting one of the synchronous clock signal and a clock signal based on the information obtained from the analog processing means, and outputting the selected clock signal as a selection clock signal used for controlling the analog processing means.

2. The optical disc recording and reproducing apparatus of claim 1 wherein the information from the analog processing means which is obtained by the clock selecting means is a rotation clock signal based on the rotation of the optical disc, which is generated by the servo unit.

3. The optical disc recording and reproducing apparatus of claim 1 further comprising:

a sector counter for holding a sector count value of a sector as a recording unit on the optical disc, and updating the sector count value according to the selection clock signal and a signal output from address detecting means; and gate signal generation switching means for generating a gate signal which controls the analog processing means based on the sector count value held in the sector counter, according to a signal indicating that an address has been detected, which is output from the address detecting means; wherein the gate signal generation switching means, when the clock selecting means has performed switching between the clock signals, does not generate the gate signal based on the sector count value until it receives the signal indicating that the address has been detected, as an input.

4. An optical disc recording and reproducing method for recording and reproducing data in and from an optical disc by the use of the optical disc as a recording medium, said method comprising:

an analog processing step including a binarization process for subjecting a signal read from the optical disc to binarization and a servo control process for controlling recording and reproducing a signal in and from the optical disc;

a synchronous clock generating step for generating a synchronous clock signal which is synchronized with the signal read from the optical disc; and a clock selecting step for selecting one of the synchronous clock signal and a clock signal based on the information obtained in the analog processing step, and outputting the selected clock signal as a selection clock signal used for controlling the analog processing step.

5. The optical disc recording and reproducing method of claim 4 wherein the information from the analog processing step which is obtained in the clock selecting step is a rotation clock signal based on the rotation of the optical disc, which is generated by the servo control process.

6. The optical disc recording and reproducing method of claim 4 further comprising:

a sector counter step for holding a sector count value of a sector as a recording unit on the optical disc, and updating the sector count value according to the selection clock signal and a signal output in an address detecting step; and a gate signal generation switching step for generating a gate signal which controls the analog processing step based on the sector count value held in the sector counter step, according to a signal indicating that an address has been detected, which is output in the address detecting step; wherein in the gate signal generation switching step, when the clock selecting step has performed switching between the clock signals, the gate signal is not generated based on the sector count value until the signal indicating that the address has been detected is input.

* * * * *